United States Patent
Choi

(10) Patent No.: US 9,422,849 B2
(45) Date of Patent: Aug. 23, 2016

(54) RESERVOIR AND TANK EQUIPPED WITH A SELF-REGULATING HEATING ELEMENT

(75) Inventor: Jae Sik Choi, Hoeilaart (BE)

(73) Assignee: INERGY AUTOMOTIVE SYSTEMS RESEARCH (Societe Anonyme), Brussels (BE)

( * ) Notice: Subject to any disclaimer, the term of this patent is extended or adjusted under 35 U.S.C. 154(b) by 639 days.

(21) Appl. No.: 13/518,731

(22) PCT Filed: Dec. 23, 2010

(86) PCT No.: PCT/EP2010/070669
§ 371 (c)(1),
(2), (4) Date: Jan. 16, 2013

(87) PCT Pub. No.: WO2011/076927
PCT Pub. Date: Jun. 30, 2011

(65) Prior Publication Data
US 2013/0125531 A1    May 23, 2013

(30) Foreign Application Priority Data

Dec. 24, 2009  (EP) ..................... 09180731

(51) Int. Cl.
| B60L 1/02 | (2006.01) |
| H05B 3/00 | (2006.01) |
| A21B 1/00 | (2006.01) |
| E21B 7/15 | (2006.01) |
| H05B 3/60 | (2006.01) |
| F24F 3/14 | (2006.01) |
| F24F 6/00 | (2006.01) |
(Continued)

(52) U.S. Cl.
CPC .............. *F01N 3/208* (2013.01); *F01N 3/2066* (2013.01); *H05B 3/82* (2013.01); *F01N 2610/02* (2013.01); *F01N 2610/10* (2013.01); *F01N 2610/1406* (2013.01); *Y02T 10/24* (2013.01)

(58) Field of Classification Search
None
See application file for complete search history.

(56) References Cited

U.S. PATENT DOCUMENTS 3,584,196 A *  6/1971  Kurokawa ............. H01C 7/022
                                                  219/432
3,651,308 A    3/1972  Kurokawa et al.
(Continued)

FOREIGN PATENT DOCUMENTS

| CN | 101238275 A | 8/2008 |
| FR | 2 916 476 | 11/2008 |
(Continued)

OTHER PUBLICATIONS

International Search Report issued on Mar. 21, 2011 in PCT/EP10/070669 filed on Dec. 23, 2010.
(Continued)

*Primary Examiner* — David Angwin
*Assistant Examiner* — Gyounghyun Bae
(74) *Attorney, Agent, or Firm* — Oblon, McClelland, Maier & Neustadt, L.L.P.

(57) ABSTRACT

A reservoir for holding a quantity of fluid within a tank, the reservoir including a first resistive element for heating a first part of the tank and a second resistive element for heating a second part of the tank, the second resistive element having a positive temperature coefficient. The reservoir further includes a third resistive element for heating the second part of the tank, the second resistive element and the third resistive element forming a parallel circuit, and the first resistive element being connected in series with the parallel circuit.

9 Claims, 4 Drawing Sheets

(51) Int. Cl.
*F01N 3/20* (2006.01)
*H05B 3/82* (2006.01)

(56) References Cited

U.S. PATENT DOCUMENTS

| | | | | |
|---|---|---|---|---|
| 3,798,413 | A * | 3/1974 | Kahn | 219/210 |
| 3,826,924 | A * | 7/1974 | Plough et al. | 307/117 |
| 3,952,182 | A * | 4/1976 | Flanders | 392/466 |
| 4,045,763 | A * | 8/1977 | Miyamoto et al. | 338/23 |
| 4,083,336 | A * | 4/1978 | Armstrong et al. | 261/39.6 |
| 4,316,080 | A | 2/1982 | Wroblewski | |
| 4,455,477 | A * | 6/1984 | Massey et al. | 392/451 |
| 4,667,584 | A * | 5/1987 | Koyama | A47J 31/106 99/280 |
| 4,680,446 | A * | 7/1987 | Post | 392/451 |
| 4,716,279 | A * | 12/1987 | Hori et al. | 219/541 |
| 5,006,689 | A * | 4/1991 | Kurachi | F24H 1/185 122/13.01 |
| 5,043,559 | A * | 8/1991 | Scott | 219/448.11 |
| 5,428,206 | A * | 6/1995 | Uchida et al. | 219/505 |
| 5,499,621 | A * | 3/1996 | Trihey | 122/17.1 |
| 6,075,923 | A * | 6/2000 | Wu | 392/451 |
| 6,792,199 | B2 * | 9/2004 | Levine et al. | 392/395 |
| 8,376,611 | B2 * | 2/2013 | Li et al. | 374/178 |
| 9,206,725 | B2 * | 12/2015 | Garcia-Lorenzana | F01N 3/2066 |
| 2004/0035409 | A1 * | 2/2004 | Harwig et al. | 126/96 |
| 2004/0182855 | A1 * | 9/2004 | Centanni | 219/628 |
| 2007/0157602 | A1 * | 7/2007 | Gschwind | 60/274 |
| 2008/0256937 | A1 * | 10/2008 | Suzuki | 60/300 |
| 2009/0065508 | A1 * | 3/2009 | Haeberer et al. | 220/562 |
| 2009/0078692 | A1 * | 3/2009 | Starck | F01N 3/2066 219/260 |
| 2009/0205320 | A1 * | 8/2009 | Mokire et al. | 60/286 |
| 2010/0025408 | A1 * | 2/2010 | Haeberer et al. | 220/564 |
| 2010/0095653 | A1 * | 4/2010 | Thiagarajan et al. | 60/286 |
| 2010/0186374 | A1 | 7/2010 | Peucat et al. | |
| 2010/0187218 | A1 | 7/2010 | Naydenov et al. | |
| 2010/0220984 | A1 * | 9/2010 | Potier | F01N 3/2066 392/441 |

FOREIGN PATENT DOCUMENTS

| | | |
|---|---|---|
| FR | 2 921 104 | 3/2009 |
| GB | 2 193 617 A | 2/1988 |
| JP | 7-142151 A | 6/1995 |
| JP | 9-245939 A | 9/1997 |
| JP | 2009-197710 A | 9/2009 |
| WO | WO 2008/138960 A1 | 11/2008 |
| WO | 2009 013329 | 1/2009 |

OTHER PUBLICATIONS

Combined Chinese Office Action and Search Report issued Dec. 25, 2014 in Patent Application No. 201080059167.5 (with English translation of categories of cited documents).

Office Action issued Jan. 19, 2015 in Japanese Patent Application No. 2012-545348 (with English language translation).

* cited by examiner

RESERVOIR AND TANK EQUIPPED WITH A SELF-REGULATING HEATING ELEMENT

The present invention relates to a reservoir for holding a quantity of fluid within a tank, the reservoir being equipped with a first resistive element for heating a first part of said tank and a second resistive element for heating a second part of said tank, the second resistive element having a positive temperature coefficient.

BACKGROUND

US Patent application 2009/0078692 A1 to Starck discloses a heating system for a liquid conveyor system, particularly for a urea supply system of a catalytic converter of an internal combustion engine. A system according to Starck comprises a filter heater and a tank heater, both of which are of the resistive type. The filter heater is formed by a heating section of a connecting line that supplies current to a PTC element of the tank heater. This design provides a filter heater and a tank heater as two resistive elements in series, wherein the tank heater comprises a PTC element to regulate the amount of current flowing to the series circuit. The object of the system according to Starck is to heat both the filter and the tank sufficiently to ensure the presence of liquid urea solution, even when the ambient temperature is below the freezing temperature of the urea solution, while avoiding overheating or unnecessary power consumption by the heaters once the desired temperature has been reached. The known circuit obtains the desired effects by using a PTC element in the second heater, placed in series with the first heater, thus limiting the current in both heaters by virtue of the PTC's temperature-resistance characteristic and the nature of a series circuit.

SUMMARY

The prior art solution does not provide sufficient freedom in modulating the respective amounts of power that are dissipated in the different parts of the tank, such as the filter heater and the tank heater.

The present invention overcomes this problem by providing an additional degree of freedom in the design, represented by resistor a third heating element.

There is thus advantageously provided a reservoir for holding a quantity of fluid within a tank, said reservoir being equipped with a first resistive element for heating a first part of said tank and a second resistive element for heating a second part of said tank, said second resistive element having a positive temperature coefficient, wherein said reservoir further comprises a third resistive element for heating said second part of said tank, said second resistive element and said third resistive element forming a parallel circuit, and said first resistive element being connected in series with said parallel circuit.

Resistive heating elements having a positive temperature coefficient are well known in the art. The term "PTC materials" is understood to include any material of which the electrical resistivity increases substantially with increasing temperature. In particular, materials of which the electrical resistivity increases by a factor 2 or more over the temperature range between −11° C. and +50° C. may advantageously be applied in the present invention. PTC elements may comprise composites of metallic and non-metallic elements. PTC elements may also comprise semiconductors.

It is a further advantage of the circuit presented here, that the heater continues to operate when the PTC element reaches very high resistivity values, at a rate determined by the choice of resistors, instead of substantially shutting off, as envisaged by the prior art solution.

In an embodiment, the first resistive element is positioned outside the reservoir, and the second resistive element and the third resistive element are positioned inside the reservoir. In a particular embodiment, the second resistive element is positioned on an accessory of the tank. In a more particular embodiment, the accessory is a pump.

In an embodiment of the reservoir according to the present invention, the second resistive element is overmoulded with a thermoplastic material.

According to another aspect, there is provided a vehicular fluid tank, comprising a reservoir according to the present invention. In an embodiment, the reservoir is placed substantially at the bottom of the vehicular fluid tank.

According to yet another aspect, there is provided use in a vehicular fluid tank, of a circuit comprising a first resistive element for heating a first part of said tank, a second resistive element for heating a second part of said tank, said second resistive element having a positive temperature coefficient, and a third resistive element for heating said second part of said tank, wherein said second resistive element and said first resistive element are connected in parallel, and said third resistive element are connected in series with said second resistive element and said first resistive element.

In an embodiment of the use of the present invention, the vehicular fluid tank is a tank for holding a urea solution.

BRIEF DESCRIPTION OF DRAWINGS

Some embodiments of apparatus and/or methods in accordance with embodiments of the present invention are now described, by way of example only, and with reference to the accompanying drawings, in which.

DETAILED DESCRIPTION

Figure 1:
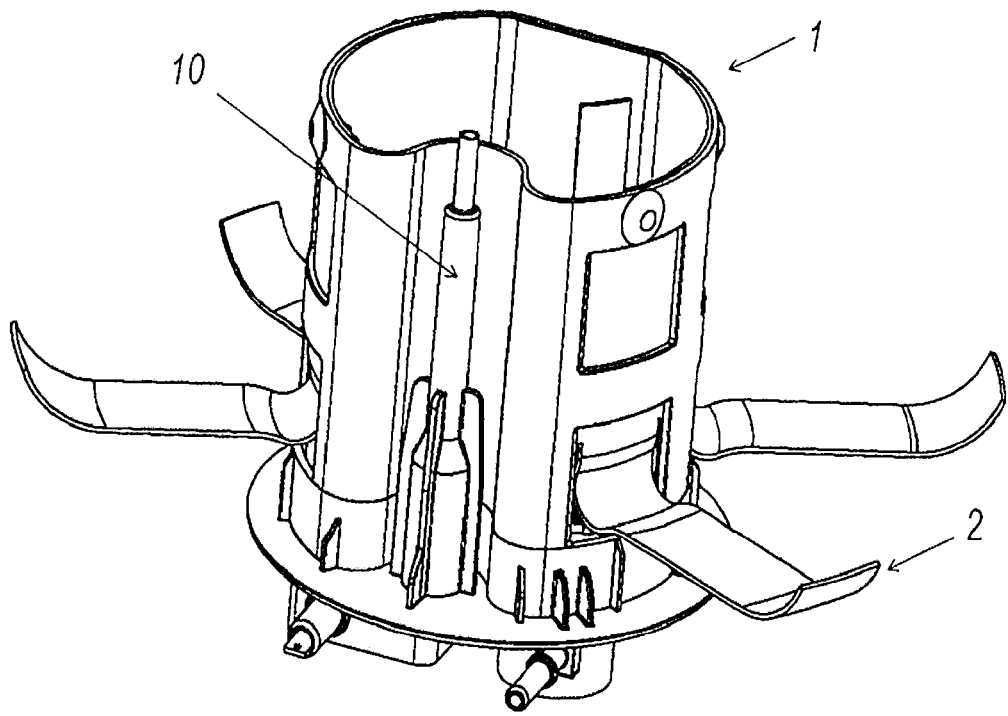
FIG. 1 illustrates a urea reservoir comprising a flexible heater according to the prior art, in which a heating element according to the invention may be used.

FIG. 1 illustrates a urea tank and reservoir 1 with a flexible heating means 2 according to the prior art. Where the heating element 2 is used to avoid freezing in a vehicular fluid tank, such as a tank for holding a urea solution as used in an emission reduction system, an active accessory 10 of the storage and/or injection system is advantageously positioned within a reservoir 1. The active accessory 10 may comprise a pump, a level gauge, a temperature sensor, a quality sensor, a pressure sensor, a pressure regulator, or similar instruments. The reservoir 1 comprises a base plate or mounting plate, and a perimeter of any shape. By placing the active accessory 10 within the reservoir, the active accessory can be provided with the intended vehicular fluid as soon as the reservoir content has reached a sufficiently elevated temperature to ensure liquidity. For example, if the tank is intended for the storage of a eutectic water/urea solution, the reservoir content needs to be heated to −11° C., i.e. the melting temperature of such a solution.

Figure 2:
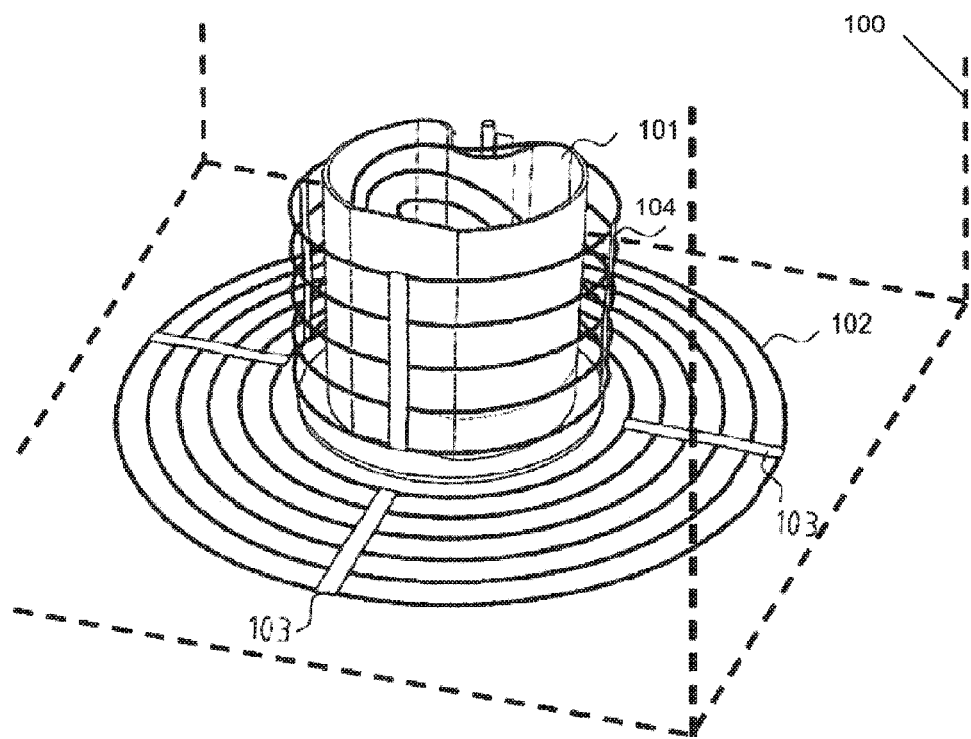
FIG. 2 illustrates an embodiment of a reservoir comprising a heating element according to a co-pending patent application in the name of applicant, in which a heating element according to the invention may be used.

FIG. 2 illustrates an embodiment of the reservoir according to the invention. The reservoir 101 shown in FIG. 1 may be a reservoir for heating part of the solution present in a vehicular fluid tank 100, such as a urea solution tank. Reservoir 101 is equipped with a flexible heating element, which comprises at least one resistive wire 102, which generates heat in response to an electric current. The resistive wire 102 may advantageously be formed out of a copper-nickel alloy or stainless steel.

The resistive wire is guided by guiding means 103 acting on several separate locations along the length of the wire, to define a heating surface, situated partly inside and partly outside the reservoir. In this manner, the substance inside the reservoir 101 may be heated to a temperature that guarantees liquidity, thus ensuring a sufficient availability of liquid substance to any active accessories that may be placed inside the reservoir 101, while the substance directly surrounding the reservoir 101 is already being pre-heated to supplement the quantity present inside the reservoir 101 when necessary.

In this embodiment, the guiding means 103 are plastic bands. Other guiding means are possible, including plastic or metallic nets. Metallic nets have the advantage of being self supporting and capable of conducting heat. The conductive wire 102 may itself be in the form of a metallic net.

In this embodiment, the guiding means 103 are applied in such a way that the part of the resulting heating surface that is outside the reservoir is substantially crinoline-shaped. For this shape, or other shapes with a substantially circular symmetry, the resistive wire 102 is bent along a spiraling path, or multiple lengths of resistive wire 102 are laid out in substantially concentric circles.

Other shapes may be formed in like manner. The surfaces thus created are not limited to planes and rolled up variations of a plane, but may exhibit curvature along several axes. Hence, for instance, spherical surfaces are possible.

The heating surface is attached to the reservoir 101 by fastening means 104 to ensure that it remains in place during use.

Figure 3:
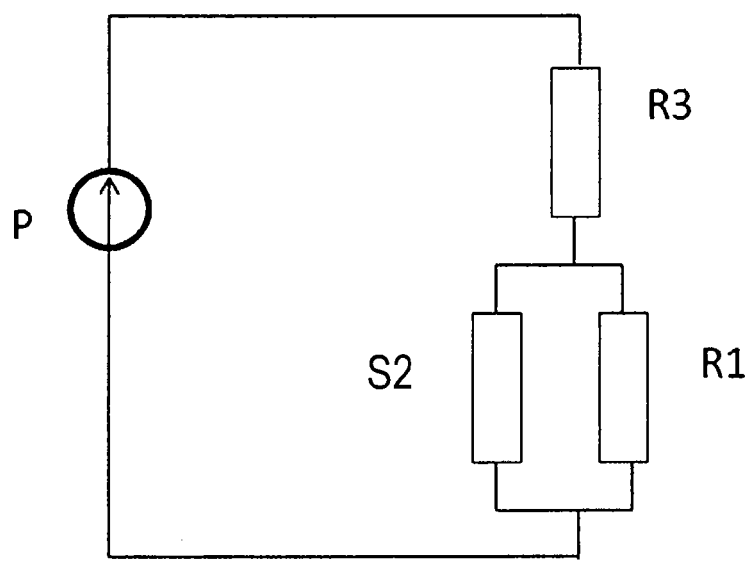
FIG. 3 is a schematic of the electronic circuit for the heating element according to the invention.

FIG. 3 is a schematic illustrating an advantageous electrical interconnection of the different parts of the heating element according to the invention. Power source P may be any suitable source of electrical current known to the skilled person. Elements R1, S2, and R3 are heating elements as described below.

Resistor R1 represents a first heating element, preferably a first length of resistive wire 102, present outside the reservoir 101, i.e. comprised in the first part of the heating surface as described above.

Element S2 is an element for controlling the distribution of power between the first and second part of the heating surface.

Resistor R3 represents a third heating element, preferably another length of resistive wire 102, present inside the reservoir 101, i.e. comprised in the second part of the heating surface as described above.

In an idealized model, element S2 may be considered to act as a switch, or any suitable combination of components cooperating to act as a switch, which, when closed, shorts out resistor R1, thus preventing heating by the first part of the heating surface. This model reveals the advantage that the heating element may be deployed in two phases: a first phase, with the element S2 acting as a switch that is closed, in which only the inside of the reservoir 101 is heated to allow a rapid start of the systems that rely on the availability of heated or liquid substance, and a second phase, with the element S2 acting as a switch that is open, during which the peripheral area outside the reservoir 101 is also heated.

In an embodiment, element S2 may be a resistor with a positive temperature coefficient, placed inside the reservoir. Element S2 may be comprised in the second part of the heating surface as described above. It is an advantage of this embodiment that the phases described above will now occur automatically and in a gradual fashion. As the inside of the reservoir 101 heats up, the resistance of element S2 increases, thus forcing an increasing fraction of the available current through resistor R1. The heating of element S2 correspond to a gradual opening of an idealized switch.

The use of the circuit of FIG. 3, in which S2 is a resistor with a positive temperature coefficient (PTC), is also advantageous in other types of heaters than the ones described above. In a generalized way, resistor R3 represents a heating element, present inside a reservoir or on a mission-critical accessory such as a pump, and resistor R1 represents a heating element, present outside the reservoir.

There is thus advantageously provided a reservoir for holding a quantity of fluid within a tank, said reservoir being equipped with a first resistive element R1 for heating a first part of said tank and a second resistive element S2 for heating a second part of said tank, said second resistive element S2 having a positive temperature coefficient, wherein said reservoir further comprises a third resistive element R3 for heating said second part of said tank, said second resistive element S2 and said first resistive element R1 forming a parallel circuit, and said third resistive element R3 being connected in series with said parallel circuit.

In an exemplary embodiment, R3 is substantially a 1Ω resistor, R1 is substantially a 3Ω resistor, and S2 is substantially a PTC element with a resistance of 1Ω at an initial low temperature, and a resistance of 3Ω at a subsequent working temperature. Applying a 12 V voltage source, which is commonly available in motor vehicles, to the circuit as shown, the reservoir will initially receive 47.0 W of power from R3 and 26.4 W of power from S2, or 73.4 W in total. Upon reaching the working temperature, the reservoir will only receive 23.0 W from R3 and 17.3 W from S2, or 40.3 W in total. The rest of the tank will initially receive 8.8 W of power from R1, rising to 17.3 W when S2 reaches working temperature.

Figure 4:
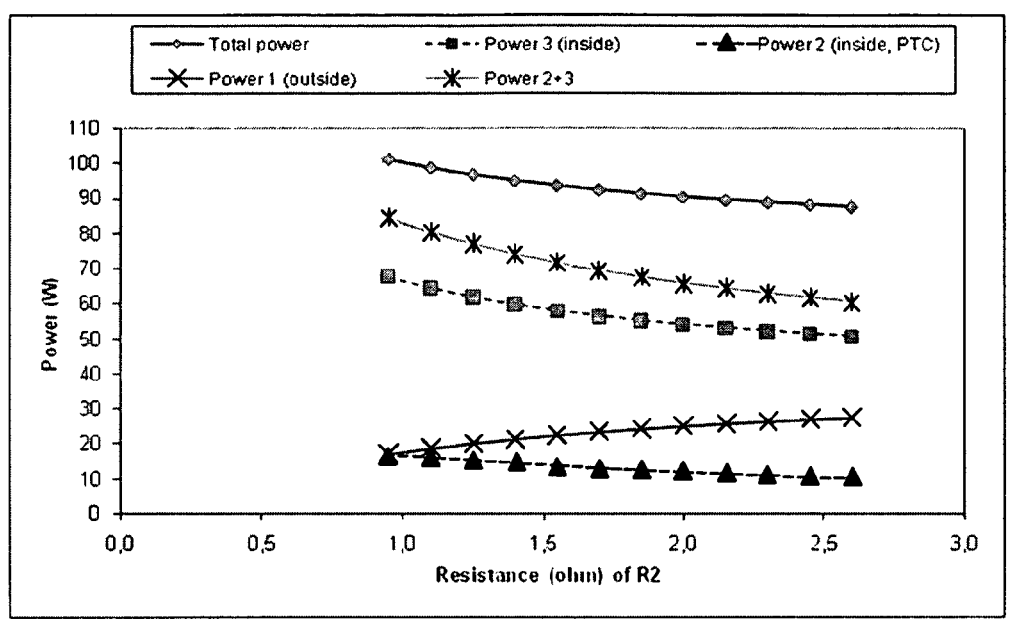
FIG. 4 is a diagram of the power dissipation of the various heating elements shown in FIG. 3.

In another exemplary embodiment, designed to initially dissipate a total power of approximately 100 W, R1 and R3 both have a resistance of 0.95Ω. S2 is selected such that it has a resistance of 1.0Ω at an initial low temperature, and a resistance of 2.8Ω at a subsequent working temperature. Applying a 12 V voltage source, the reservoir will initially receive 67.4 W of power from R3 and 16.8 W of power from S2, or 84.2 W in total. Upon reaching the working temperature, the reservoir will only receive 49.9 W from R3 and 9.5 W from S2, or 59.4 W in total. The rest of the tank will initially receive 16.8 W of power from R1, rising to 27.6 W when S2 reaches working temperature. This power dissipation evolution is illustrated in the diagram of FIG. 4. The horizontal axis of this diagram represents the resistance of S2. As the temperature increases with time under the influence of the operation of the heating elements, and as the resistance of S2 increases with increasing temperature as a consequence of the positive temperature coefficient of S2, the horizontal axis of the diagram can be interpreted as equivalent to a time axis. However, the precise time dependency will depend on the thermal properties of the environment in which the heating elements are placed, and on the actual temperature dependence of the resistance of S2.

In the examples above, the initial low temperature may be −11° C., and the subsequent working temperature may be between 40° C. and 50° C. The total amount of power dissipated by the various heating elements of the reservoir according to the present invention is preferably chosen in accordance with the environmental conditions and the regulatory requirements that apply in the market in which the system is to be used.

The PTC element in the reservoir according to the present invention is preferably shielded from the fluids that may be contained in the reservoir. To this end, the PTC element is preferably overmoulded with a suitable thermoplastic material during or after the production of the reservoir. The selected thermoplastic material must be able to withstand the range of temperatures in which the heating element operates, preferably the range between −40° C. and +50° C.

It is furthermore necessary to ensure an electrically insulated and leak tight connection between the PTC element and the wires supplying current to the PTC element. Such a connection may be obtained by using a shrink tube made of a suitable elastomer or polymer compound, or a mechanical crimping connector.

The reservoir according to the invention is advantageously mounted inside a tank, such as a vehicular fluid tank, preferably in a passenger vehicle. For optimal operation, it is preferably placed at the bottom, or at least at a low point of the tank, where the bulk of the fluid would naturally be present due to the gravitational force. The outer part of the flexible heating element is advantageously spread around the reservoir in a way that ensures supply of pre-heated fluid towards the reservoir.

Tentacles of the heating surface or lengths of resistive wire may extend into cavities or outlying regions of the tank, to avoid the long-term presence of frozen substance at these places.

Tentacles of the heating surface or lengths of resistive wire may also extend inside or around pipes and conduits that are part of the fluid transport system into and out of the tank, to avoid the blockage of these pipes and conduits by frozen substance.

In an embodiment, the heating surface is adapted to be foldable, preferable like an umbrella. This embodiment has the advantage that the heating element may be combined with a reservoir already present in a tank, by inserting the heating element into the tank in folded form, and deploying it inside the tank.

The invention has been described above in reference to certain exemplary embodiments. These embodiments are intended for illustrative purposes, and do not limit the invention, the scope of which is determined by the enclosed claims.

The invention claimed is:

1. A reservoir to hold a quantity of fluid within a tank, said reservoir comprising:
    a first resistive element to electrically heat a first part of a tank, said first resistive element positioned outside said reservoir;
    a second element to electrically heat a second part of said tank, said second element positioned inside said reservoir, said second element having a positive temperature coefficient; and
    a third resistive element to electrically heat said second part of said tank, said third resistive element positioned inside said reservoir,
    said second element and said first resistive element forming a parallel circuit, and said third resistive element being connected in series with said parallel circuit,
    wherein said reservoir is mounted inside said tank,
    wherein at a first time corresponding to a start the heating, the second element has a first resistance so as to dissipate a first power within the reservoir, and
    wherein at a later second time the second element has a second resistance so as to dissipate a second power within the reservoir, the second power being lower than the first power so that a total power dissipated in the tank is lower at the second time than at the first time.

2. The reservoir of claim 1, wherein said second element is positioned on an accessory of said tank.

3. The reservoir of claim 2, wherein said accessory is a pump.

4. The reservoir of claim 1, wherein said second element is overmolded with a thermoplastic material.

5. A vehicular fluid tank, comprising:
    a reservoir including:
        a first resistive element to electrically heat a first part of said tank, said first resistive element positioned outside said reservoir,
        a second element to electrically heat a second part of said tank, said second element positioned inside said reservoir, said second element having a positive temperature coefficient, and
        a third resistive element to electrically heat said second part of said tank, said third resistive element positioned inside said reservoir,
        said second element and said first resistive element forming a parallel circuit, and said third resistive element being connected in series with said parallel circuit,
    wherein said reservoir is mounted inside said tank,
    wherein at a first time corresponding to a start of the heating, the second element has a first resistance so as to dissipate a first power within the reservoir, and
    wherein at a later second time the second element has a second resistance so as to dissipate a second power within the reservoir, the second power being lower than the first power so that a total power dissipated in the tank is lower at the second time than at the first time.

6. The vehicular fluid tank according to claim 5 wherein said reservoir is placed substantially at a bottom of said vehicular fluid tank.

7. A method comprising:
    using a circuit in a vehicular fluid tank, said tank comprising a reservoir mounted inside to hold a quantity of fluid within said tank, said circuit including
        a first resistive element to electrically heat a first part of said tank, said first resistive element positioned outside said reservoir,
        a second element to electrically heat a second part of said tank, said second element positioned inside said reservoir, said second element having a positive temperature coefficient, and
        a third resistive element to electrically heat said second part of said tank, said third element positioned inside said reservoir,
    wherein said second element and said first resistive element are connected in parallel, and said third resistive element is connected in series with said second element and said first resistive element,
    wherein at a first time corresponding to a start of the heating, the second element has a first resistance so as to dissipate a first power, and
    wherein at a later second time the second element has a second resistance so as to dissipate a second power, the second power being lower than the first power so that a total power dissipated in the tank is lower at the second time than at the first time.

8. The method of claim 7, further comprising:
holding a urea solution in the vehicular fluid tank.

9. A reservoir to hold a quantity of fluid within a tank, said reservoir comprising:
- a flexible heating element which includes a resistive wire forming a spiraling path or several concentric circles;
- a first resistive element to electrically heat a first part of a tank, a first length of said resistive wire outside the reservoir forming said first element;
- a second element to electrically heat a second part of said tank, said second element having a positive temperature coefficient; and
- a third resistive element to electrically heat said second part of said tank, a second length of said resistive wire inside the reservoir forming said third resistive element,
- said second element and said first resistive element forming a parallel circuit, and said third resistive clement being connected in series with said parallel circuit,
- wherein said reservoir is mounted inside said tank, and
- wherein at a first time corresponding to a start of the heating, the second element has a first resistance so as to dissipate a first power within the reservoir and wherein at a later second time the second element has a second resistance so as to dissipate a second power within the reservoir, the second power being lower than the first power so that the power dissipated in the tank is lower at the second time than at the first time.

\* \* \* \* \*